(12) United States Patent
Carragher

(10) Patent No.: US 11,525,329 B2
(45) Date of Patent: *Dec. 13, 2022

(54) APPARATUS FOR USE IN WELL ABANDONMENT

(71) Applicant: BiSN Tec Ltd, Warrington (GB)

(72) Inventor: Paul Carragher, Lymm (GB)

(73) Assignee: BiSN Tec. Ltd., Cheshire (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/173,286

(22) Filed: Oct. 29, 2018

(65) Prior Publication Data

US 2019/0128091 A1 May 2, 2019

Related U.S. Application Data

(60) Continuation of application No. 15/011,308, filed on Jan. 29, 2016, now Pat. No. 10,113,386, which is a
(Continued)

(30) Foreign Application Priority Data

Dec. 20, 2012 (GB) ..................... 1223055

(51) Int. Cl.
E21B 33/12 (2006.01)
E21B 33/134 (2006.01)
(Continued)

(52) U.S. Cl.
CPC .............. *E21B 33/13* (2013.01); *C06B 33/00* (2013.01); *C06B 47/00* (2013.01); *C09K 8/426* (2013.01);
(Continued)

(58) Field of Classification Search
CPC ...... E21B 33/10; E21B 33/1208; E21B 17/00; E21B 17/14; E21B 33/134; E21B 33/138; E21B 43/103; E21B 33/13; E21B 29/10
(Continued)

(56) References Cited

U.S. PATENT DOCUMENTS 1,534,229 A 4/1925 Livergood
2,076,308 A 4/1937 Wells
(Continued)

FOREIGN PATENT DOCUMENTS

CA 2592556 6/2007
EP 1 933 004 6/2008
(Continued)

OTHER PUBLICATIONS

Aug. 7, 2015, WIPO, PCT/GB2013/053397 Search Report and Opinion.

*Primary Examiner* — Jennifer H Gay

(57) ABSTRACT

A plug for plugging wells, and in particular oil and gas wells, is provided. The plug has a plug body formed from an outer metal tube of a reduced thickness. The plug also has reinforcement means, attached to an inner surface of the outer tube, that give the plug a cross-sectional structural strength that is at least equivalent to that of a thicker metal tube. The plug has a central heater receiving void located along the axis of the plug to enable a plug deployment heater to be received therein. Also provided is a plug assembly with a variable cross-sectional area in a plane perpendicular to the plane in which the assembly is deployed during the plugging of underground conduits.

3 Claims, 4 Drawing Sheets

Related U.S. Application Data division of application No. 14/654,423, filed as application No. PCT/GB2013/053397 on Dec. 20, 2013, now Pat. No. 10,161,215, application No. 16/173,286, which is a continuation of application No. 14/654,423, filed as application No. PCT/GB2013/053397 on Dec. 20, 2013, now Pat. No. 10,161,215.

(51) Int. Cl.

| | | |
|---|---|---|
| *E21B 33/13* | (2006.01) | |
| *C22C 12/00* | (2006.01) | |
| *E21B 27/02* | (2006.01) | |
| *E21B 36/00* | (2006.01) | |
| *E21B 33/136* | (2006.01) | |
| *E21B 17/10* | (2006.01) | |
| *C06B 33/00* | (2006.01) | |
| *C06B 47/00* | (2006.01) | |
| *C09K 8/42* | (2006.01) | |
| *C22C 9/00* | (2006.01) | |
| *E21B 47/00* | (2012.01) | |

(52) U.S. Cl.
CPC ............... *C22C 9/00* (2013.01); *C22C 12/00* (2013.01); *E21B 17/1028* (2013.01); *E21B 27/02* (2013.01); *E21B 33/12* (2013.01); *E21B 33/1204* (2013.01); *E21B 33/1208* (2013.01); *E21B 33/134* (2013.01); *E21B 33/136* (2013.01); *E21B 36/008* (2013.01); *E21B 47/00* (2013.01)

(58) Field of Classification Search
USPC .............................. 166/242.1, 242.8, 242.9
See application file for complete search history.

(56) References Cited

U.S. PATENT DOCUMENTS

| | | | |
|---|---|---|---|
| 2,149,874 A * | 3/1939 | Stang ................ E21B 7/18 | 175/314 |
| 2,583,316 A * | 1/1952 | Bannister ............ E21B 43/103 | 166/387 |
| 2,686,689 A | 8/1954 | Douglas | |
| 2,789,004 A | 4/1957 | Forster | |
| 2,822,876 A | 2/1958 | Murrow | |
| 3,054,455 A * | 9/1962 | Keltner ............... E21B 33/134 | 166/143 |
| 3,119,451 A | 1/1964 | Hall | |
| 3,170,516 A * | 2/1965 | Corley, Jr. ............ E21B 33/134 | 166/286 |
| 3,203,483 A * | 8/1965 | Vincent ............... E21B 43/105 | 166/207 |
| 3,208,530 A * | 9/1965 | Allen ................. E21B 33/1204 | 166/60 |
| 3,552,779 A * | 1/1971 | Henderson ............ E21B 17/00 | 285/123.3 |
| 3,608,640 A * | 9/1971 | Willhite ............... E21B 17/18 | 166/380 |
| 3,865,188 A * | 2/1975 | Doggett ............. E21B 33/1243 | 166/285 |
| 3,871,315 A | 3/1975 | Andersen | |
| 4,024,916 A * | 5/1977 | Hartley ................ E21B 33/13 | 166/288 |
| 4,134,452 A | 1/1979 | Kingelin | |
| 4,385,668 A * | 5/1983 | Becker ................ E21B 17/18 | 138/113 |
| 4,423,783 A * | 1/1984 | Haag ................ E21B 17/1028 | 166/120 |
| 4,488,747 A | 12/1984 | Austin | |
| 4,495,997 A * | 1/1985 | Scott ................. E21B 33/14 | 166/242.1 |
| 4,523,640 A | 6/1985 | Wilson | |
| 4,624,485 A * | 11/1986 | McStravick ............ E21B 17/00 | 138/149 |
| 4,696,343 A * | 9/1987 | Anderson ............ E21B 33/136 | 166/164 |
| 4,923,007 A * | 5/1990 | Sanford .............. E21B 33/1277 | 166/187 |
| 4,949,797 A * | 8/1990 | Isom .................. E21B 17/003 | 175/215 |
| 4,988,389 A * | 1/1991 | Adamache ............. E21B 36/04 | 166/105 |
| 5,052,489 A * | 10/1991 | Carisella ............. E21B 43/1185 | 166/297 |
| 5,456,319 A * | 10/1995 | Schmidt .................. E21B 23/06 | 166/192 |
| 5,551,484 A * | 9/1996 | Charboneau ........ F16L 55/1656 | 138/104 |
| 5,564,861 A | 10/1996 | Khudenko | |
| 5,791,416 A * | 8/1998 | White ................ E21B 17/1042 | 166/177.4 |
| 5,957,195 A * | 9/1999 | Bailey .................... E21B 43/103 | 166/55 |
| 6,015,015 A * | 1/2000 | Luft .................... E21B 17/1007 | 166/241.6 |
| 6,102,120 A | 8/2000 | Chen | |
| 6,454,001 B1 * | 9/2002 | Thompson ............ E21B 33/136 | 166/135 |
| 6,474,414 B1 * | 11/2002 | Gonzalez ................ F16L 55/10 | 166/277 |
| 6,634,388 B1 * | 10/2003 | Taylor ..................... B29C 63/34 | 138/104 |
| 6,664,522 B2 | 12/2003 | Spencer | |
| 6,828,531 B2 * | 12/2004 | Spencer ................... E21B 33/13 | 219/635 |
| 6,923,263 B2 | 8/2005 | Edin | |
| 6,978,843 B2 * | 12/2005 | Gleim ...................... E21B 17/20 | 166/242.1 |
| 7,048,052 B2 * | 5/2006 | Hackworth ............. E21B 17/00 | 166/277 |
| 7,152,657 B2 | 12/2006 | Bosma | |
| 7,290,609 B2 * | 11/2007 | Wardlaw ............... E21B 33/134 | 166/192 |
| 7,475,723 B2 * | 1/2009 | Ring ..................... E21B 43/103 | 166/212 |
| 7,478,651 B2 * | 1/2009 | Simpson ................ E21B 17/18 | 138/98 |
| 7,798,225 B2 * | 9/2010 | Giroux ................. E21B 47/117 | 166/285 |
| 8,151,895 B1 * | 4/2012 | Kunz .................. E21B 33/1277 | 166/387 |
| 8,230,913 B2 * | 7/2012 | Hart ...................... E21B 43/106 | 166/207 |
| RE45,011 E * | 7/2014 | Schetky ................... E21B 23/00 | 166/380 |
| 9,194,218 B2 * | 11/2015 | Hallundbaek et al. ............... E21B 33/128 | |
| 10,113,386 B2 * | 10/2018 | Carragher ............ E21B 33/134 | |
| 2002/0018697 A1 * | 2/2002 | Vinegar .................. B09C 1/062 | 405/128.55 |
| 2002/0056553 A1 | 5/2002 | Duhon | |
| 2002/0107562 A1 * | 8/2002 | Hart ...................... E21B 43/086 | 623/1.15 |
| 2002/0162596 A1 * | 11/2002 | Simpson ................ E21B 17/18 | 138/98 |
| 2003/0132224 A1 | 7/2003 | Spencer | |
| 2004/0035584 A1 * | 2/2004 | Gleim ...................... E21B 17/20 | 166/369 |
| 2004/0065445 A1 * | 4/2004 | Abercrombie Simpson ............... E21B 23/01 | 166/382 |
| 2004/0149418 A1 * | 8/2004 | Bosma ................... E21B 29/10 | 164/98 |
| 2004/0154797 A1 * | 8/2004 | Carmody .............. E21B 43/103 | 166/285 |
| 2004/0261994 A1 * | 12/2004 | Nguyen ................ E21B 43/088 | 166/278 |
| 2005/0109511 A1 | 5/2005 | Spencer | |

(56) References Cited

U.S. PATENT DOCUMENTS

| | | | |
|---|---|---|---|
| 2005/0199307 A1* | 9/2005 | Eden | E21B 33/1204 138/89 |
| 2006/0037748 A1* | 2/2006 | Wardlaw | E21B 33/134 166/277 |
| 2006/0124295 A1* | 6/2006 | Maguire | E21B 43/105 166/207 |
| 2006/0144591 A1* | 7/2006 | Gonzalez | E21B 29/10 166/277 |
| 2007/0051514 A1 | 3/2007 | La Rovere | |
| 2008/0006413 A1* | 1/2008 | Le Gloahec | E21B 43/108 166/369 |
| 2008/0047708 A1* | 2/2008 | Spencer | E21B 33/138 166/288 |
| 2008/0245532 A1* | 10/2008 | Rhinehart | E21B 10/32 166/376 |
| 2009/0183884 A1* | 7/2009 | Hansen | E21B 29/10 166/376 |
| 2009/0272544 A1* | 11/2009 | Giroux | E21B 43/108 166/382 |
| 2010/0006289 A1* | 1/2010 | Spencer | E21B 33/1208 166/292 |
| 2010/0089584 A1* | 4/2010 | Burns | E21B 43/2401 166/302 |
| 2010/0126735 A1* | 5/2010 | Allison | E21B 33/1208 166/387 |
| 2010/0155085 A1* | 6/2010 | Spencer | E21B 41/0064 166/386 |
| 2010/0263876 A1 | 10/2010 | Frazier | |
| 2011/0132223 A1 | 6/2011 | Streibich | |
| 2011/0146519 A1 | 6/2011 | Han | |
| 2011/0174484 A1 | 7/2011 | Wright | |
| 2011/0214855 A1* | 9/2011 | Hart | E21B 43/106 166/242.1 |
| 2012/0193096 A1* | 8/2012 | Gray | E21B 33/134 166/285 |
| 2012/0199351 A1* | 8/2012 | Robertson | E21B 17/06 166/297 |
| 2012/0298359 A1 | 11/2012 | Eden | |
| 2012/0312561 A1 | 12/2012 | Hallundaek | |
| 2013/0087335 A1* | 4/2013 | Carragher | E21B 23/00 166/288 |
| 2013/0192833 A1 | 8/2013 | Gano | |
| 2013/0220640 A1* | 8/2013 | Fripp | E21B 43/106 166/386 |
| 2014/0096949 A1* | 4/2014 | Mclaren | E21B 33/136 166/135 |
| 2014/0318782 A1* | 10/2014 | Bourque | E21B 27/02 166/286 |
| 2015/0211326 A1 | 7/2015 | Lowry | |
| 2015/0211327 A1 | 7/2015 | Lowry | |
| 2015/0211328 A1 | 7/2015 | Lowry | |
| 2015/0345248 A1* | 12/2015 | Carragher | E21B 33/134 166/57 |
| 2015/0368542 A1 | 12/2015 | Carragher | |
| 2016/0145962 A1* | 5/2016 | Carragher | E21B 33/134 166/57 |
| 2016/0208588 A1* | 7/2016 | Snow | E21B 43/2401 |
| 2016/0273293 A1* | 9/2016 | Surjaatmadja | E21B 43/114 |
| 2016/0319633 A1* | 11/2016 | Cooper | E21B 23/065 |
| 2017/0030162 A1 | 2/2017 | Carragher | |
| 2017/0089168 A1 | 3/2017 | Carragher | |
| 2017/0226819 A1 | 8/2017 | Carragher | |
| 2017/0234093 A1 | 8/2017 | Carragher | |
| 2017/0234100 A1 | 8/2017 | Carragher | |
| 2017/0306717 A1 | 10/2017 | Carragher | |
| 2018/0148991 A1* | 5/2018 | Hearn | E21B 33/12 |
| 2019/0014355 A1 | 5/2019 | Carragher | |
| 2019/0085659 A1 | 5/2019 | Carragher | |
| 2019/0128091 A1* | 5/2019 | Carragher | E21B 17/1028 |
| 2019/0178049 A1* | 6/2019 | Kraemer | E21B 33/1285 |
| 2019/0186230 A1 | 6/2019 | Carragher | |
| 2020/0173250 A1 | 6/2020 | Carraher | |
| 2020/0248526 A1 | 8/2020 | Carragher | |

FOREIGN PATENT DOCUMENTS

| | | |
|---|---|---|
| GB | 2016063 | 9/1979 |
| GB | 2 164 886 | 4/1986 |
| WO | WO 2011/151171 | 12/2011 |
| WO | WO 2013/066340 | 5/2013 |
| WO | WO-2017137226 A1 * | 8/2017 ........... E21B 33/134 |

* cited by examiner

APPARATUS FOR USE IN WELL ABANDONMENT

RELATED APPLICATIONS

This application is: (i) a continuation of U.S. Ser. No. 15/011,308 filed Jan. 29, 2016 and which is a divisional application of U.S. application Ser. No. 14/654,423, filed Jun. 19, 2015, which is a national stage entry under 35 U.S.C. 371 International Application No. PCT/GB2013/053397, filed Dec. 20, 2013, which claims priority to Great Britain Application No. 1223055.3, filed Dec. 20, 2012; and (ii) a continuation of of U.S. application Ser. No. 14/654,423, filed Jun. 19, 2015, which is a national stage entry under 35 U.S.C. 371 International Application No. PCT/GB2013/053397, filed Dec. 20, 2013, which claims priority to Great Britain Application No. 1223055.3, filed Dec. 20, 2012, each of which are each incorporated herein by reference in their entirety.

FIELD OF THE INVENTION

The present invention relates to the plugging of underground conduits such as wells, and in particular oil and gas wells. More particularly the present invention relates to Bismuth-based or other eutectic plugs and plug deployment apparatus for use in the plugging of underground conduits such as wells.

BACKGROUND OF THE INVENTION

When a well, such as an oil or gas well, is at the end of its useful life it is usually abandoned. In other situations (e.g. due to low oil prices, "workovers" and other events such as approaching storms or hurricanes) a well may need to be temporarily suspended. However before a well can be abandoned/suspended the well must be "plugged" to ensure that potentially hazardous materials, such as hydrocarbons, cannot escape the well.

In the past various methods have been employed to plug abandoned wells. One such known method involves pouring cement or resin into a well so as to fill a length of the well. However the use of cement/resin has proven to be unreliable and vulnerable to leaking. This can lead to previously abandoned wells being re-plugged at considerable extra expense.

In view of the limitations of using cement/resin to plug wells an alternative approach was developed which uses a bismuth-containing alloy to form a seal within the well. This approach, which is described in detail in CA 2592556 and U.S. Pat. No. 6,923,283, makes use of the fact that such alloys contract upon melting and expand again when they re-solidify. Essentially the alloy is deployed into a well; heated until it melts and "slumps"; and then allowed to cool whereby the alloy expands to form a tight seal with the wails of the well.

The use of eutectic alloys, such as bismuth-containing alloys, to plug wells or repair existing plugs in wells is described in: U.S. Pat. Nos. 7,290,609; 7,152,657; US 2006/0144591; U.S. Pat. Nos. 6,828,531; 8,664,522; 6,474,414; and US 2005/0109511.

SUMMARY OF THE INVENTION

The present invention relates to improvements in the apparatus used in, amongst other things, well abandonment and well suspension. The improvements relate in particular to the plugs used to close off or 'plug' wells (and other underground conduits), and the heaters used to deploy plugs and/or retrieve plugs from an underground conduit, such as a well casing.

A first aspect of the present invention relates to a plug for plugging wells, and in particular oil and gas wells, said plug comprising a plug body formed from an outer metal tube of a reduced thickness and reinforcement means, attached to an inner surface of the outer tube to give the plug a cross-sectional structural strength that is at least equivalent to that of a thicker metal tube; and wherein said plug has a central heater receiving void located along the axis of the plug.

By forming the plug from an outer tube that is thinner than typical plugs and then reinforcing the outer tube in the cross-sectional direction (i.e. across the diameter of the plug) it is possible to provide a plug that has ail the required strength to maintain a plug within a well whilst at the same time allowing for the plug to be more easily drilled out (i.e. due to the weaker structural strength along the length of the plug) if required.

By way of reference it should be noted that the wail thickness of the tubes currently being used in well plugs is in the region of 5 mm, whereas the wall thickness of the tubes used in the present invention is considerably less at around 1-3 mm.

Preferably the reinforcement means attached to the outer tube comprises corrugated metal. Alternatively the reinforcement means attached to outer comprises a 'honeycomb' metal mesh. It is appreciated that both these reinforcement means, when correctly orientated, achieve the required structural strength in cross-section and yet remain weaker along the length of the plug. This allows for the plug to be more easily drilled out (i.e. because there is less metal to drill through).

Preferably the plug comprises a plug body formed from an outer metal tube and an inner metal tube connected together co-axially by way of reinforcement means that attach to an inner surface of the outer tube and the outer surface of the inner tube at discrete points.

Once again, by forming the plug body from two thinner metal tubes connected together in this way it is possible to create a plug that is strong in a horizontal plane (i.e. across the diameter of the tubes) but weaker in a vertical plane (i.e. down the co-axis of the tubes).

This selective weakness means that the plug body will perform its function of plugging a well (for example) until such time as removal of the plug is required. if, in such situations, the plug cannot be retrieved using the apparatus and methods described in WO2011/151271, the above described arrangement of the plug body means that the plug is much easier to drilled out that standard plug bodies which are typically made from single solid metal tube (e.g. steel) of greater thickness.

Preferably the reinforcement means that attach the inner and outer tubes together comprises corrugated metal located in the gap between the inner and outer tubes.

Alternatively the reinforcement means that attach the inner and outer tubes together comprises a 'honeycomb' metal mesh located in the gap between the inner and outer tubes.

A second aspect of the present invention relates to a plug assembly with a variable cross-sectional area in a plane perpendicular to the plane in which the assembly is deployed during the plugging of underground conduits (i.e. such as those suffering from drifting or other obstacles), said assembly comprising: a plug having a plug body with a first cross-sectional area corresponding to the minimum cross-sectional area of the assembly; at least one compressible plug portion that is resiliency biased to form a second cross-sectional area corresponding to the maximum cross-sectional area of the assembly; and a plug deployment heater releasably engageable within the plug, and comprising eutectic alloy retaining means that retain an eutectic alloy in-line with the plug during deployment of the assembly within an underground conduit so as to enable the minimum cross-sectional area of the assembly to be achieved.

When abandoning a well bridge plugs need to be placed as close as possible to the producing zones as required by legislation (different from country to country, state to state).

This can cause significant issues as the well hole or the casing supporting the well can be damaged over the life time of the well, which can cause restrictions that reduce the size of the well bore.

Redundant down-hole equipment can also restrict access to the lower regions of the well. Such equipment can sometimes be difficult or impossible to remove due to damage, scaling or corrosion.

Bridge plugs traditionally have a small drift (i.e. the distance between the outside of the tool and the inside of the well bore) this means that they have difficulty in by passing these restrictions so that they can be placed in the position that may be required by the regulations.

Attempts have been made to overcome this by reducing the size of the plug relative to the well hole/casing that is to be plugged. However this has an effect on the reliability and holding pressure of the bridge plug.

Another issue is that traditional bridge plugs have a narrow operating window as two different versions might be needed for the same casing size (i.e. 4 and half inches or about 12 cm) but different casing weights, as the drift can increase significantly as the casing weight decreases, in older wells the records of casing weights can be incomplete so it difficult to know whether a plug will hold as the weight and hence the drift is unknown so the plug might be out of its specification range.

The plug assembly provided in this aspect of the present invention is capable of reducing its cross-sectional area (e.g. diameter) as it meets with obstacles during its delivery into the well casing and then springing back to an increased cross-sectional area once it has passed the obstructions.

This ability of the assembly to return to the increased cross-sectional area allows any space between the plug and a well casing to be minimized, thus facilitating the formation of an effective bismuth plug.

Furthermore, by delivering the eutectic alloy into the well casing in-line with the plug the cross-sectional area can be kept to a minimum, whereas in the past the alloy might have been located on the outside of the plug increasing its diameter. Preferably the at least one compressible plug portion comprises an umbrella spring arrangement which is expandable to increase the cross-sectional area of the assembly and compressible to decrease the cross-sectional area of the assembly.

Further preferably the umbrella spring arrangement is formed from or coated in a material capable of withstanding high temperatures, in this way umbrella spring arrangement can make contact with the wails of the well casing to retain the molten alloy in close proximity with the plug during cooling.

Preferably the alloy retaining means comprise a dump bailer located on the same axis to and in-line with the plug. Further preferably the dump bailer comprises release means that can be operated remotely to discharge the alloy into the area adjacent to the plug.

Advantageously the dump bailer and the ignition means of the plug deployment heater may be triggered in a two-stage process by way of a single 'go' signal received by the assembly. In one arrangement the first stage involves the dump bailer release means being activated to discharge the alloy and then the second stage involves the activation of the heater.

It is envisaged, however, that this triggering series may advantageously be reversed so that the heater has already started to heat up when the alloy is released.

Although the dump bailer is described above in combination with the rest of the deployment apparatus it is appreciated that the in-line dump bailer may be used on a deployment apparatus (e.g. heater) that does not employ the variable cross-sectional area capability. The present invention therefore provides a plug deployment apparatus comprising an in-line dump bailer.

It is envisaged that Germanium/bismuth alloys and the thermite heating compositions may be used in combination with any of the other aspects of the present invention.

BRIEF DESCRIPTION OF THE DRAWINGS

Various aspects of the present invention will now be described with reference to the drawings, wherein.

DESCRIPTION OF THE VARIOUS ASPECTS OF THE PRESENT INVENTION

It is envisaged that the various aspects of the present invention can be use alone or in combination with one another to provide real benefits in the plugging of underground conduits. In this regard it is envisaged that the present invention is particularly applicable in plugging both vertical and non-vertical wells (with or without well casings).

The described aspects can also be used together with the methods and apparatus described in WO2011/151271 to facilitated the squeezing off and repairing of wells.

Whilst the various aspects of the present invention are considered particularly applicable to the plugging of oil and gas wells it is envisaged that they would provide benefits when plugging other forms of underground conduits such as water pipes for example.

Figure 1:
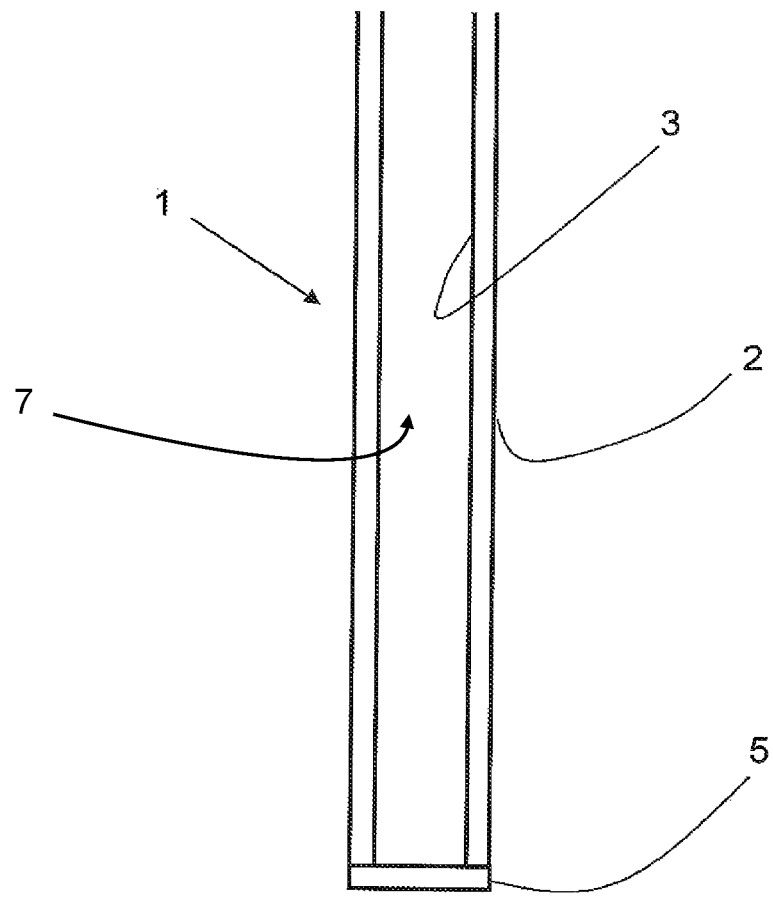
FIG. 1 shows a cut away side view of a plug according to the first aspect of the present invention.
Figure 2:
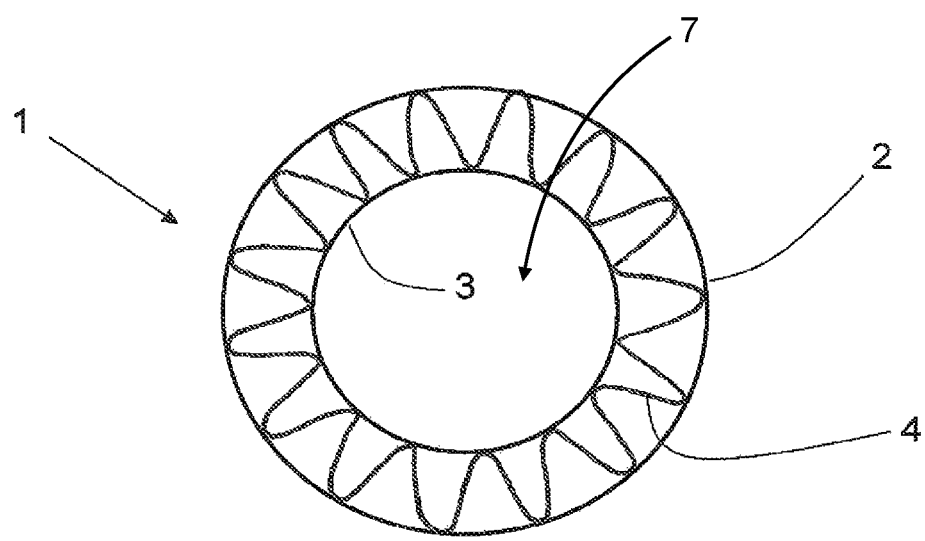
FIG. 2 shows an end view of a plug according to the first aspect of the present invention.

FIGS. 1 and 2 show a plug according to the first aspect of the present invention. The plug is shown in a simplified view for the sake of clarify, however it should be assumed that other features (e.g. heater engaging means) required of plugs of the type described in this document and in WO2011/151271 can be adopted without departing from the concept of this aspect of the present invention.

FIG. 1 shows a cut-away side view of the plug 1 from which the outer tube 2 and the inner tube 3 can be appreciated. The inner and outer tubes, which are preferably circular in cross-section but may have other shapes as required, are spaced apart by the reinforcement means 4 (not shown in FIG. 1). The plug 1 has a central heater receiving void 7 located along the axis of the plug to enable a plug deployment heater to be received therein.

So that the plug has the required structural strength and resilience both the inner and outer tubes are made from a metal, preferably carbon steel, stainless steel or titanium or other metal alloys suitable for the down-hole conditions. The thickness of the tube wails is in the region of 2 to 3 mm, although wail thicknesses in the region of 1 mm are also contemplated. The two tubes would normally be of a similar thickness.

The plug 1 is provided with a base 5 to which both the inner and outer tubes are connected, for example by welding. The feature is preferable in most embodiments of this aspect of the present invention.

Although spaced apart, the inner 2 and outer 3 tubes are connected together to form a structurally sound plug by virtue of reinforcement means 4. The reinforcement means 4 take the form of corrugated metal (preferably steel or titanium) which is bent back and forth between the inner wail of the outer tube 2 and the outer wail of the inner tube 3.

Wherever the reinforcement means 4 touch the walls of the tubes there is a connection. Preferably the connection is formed by welding or a mechanical fixing (e.g. bolts).

The reinforcement means 4 serves to hold the inner and outer tubes together in such a way as to form a plug with the required level of structural strength. However it is envisaged that by replacing a single solid tube having a thick metal wail-as is currently used in plug bodies—with two tubes with thinner metal wails makes it much easier to drill through the plug body. This provides a further option for removing an unwanted well plug when alternative methods of extraction are not possible.

Figure 2A:
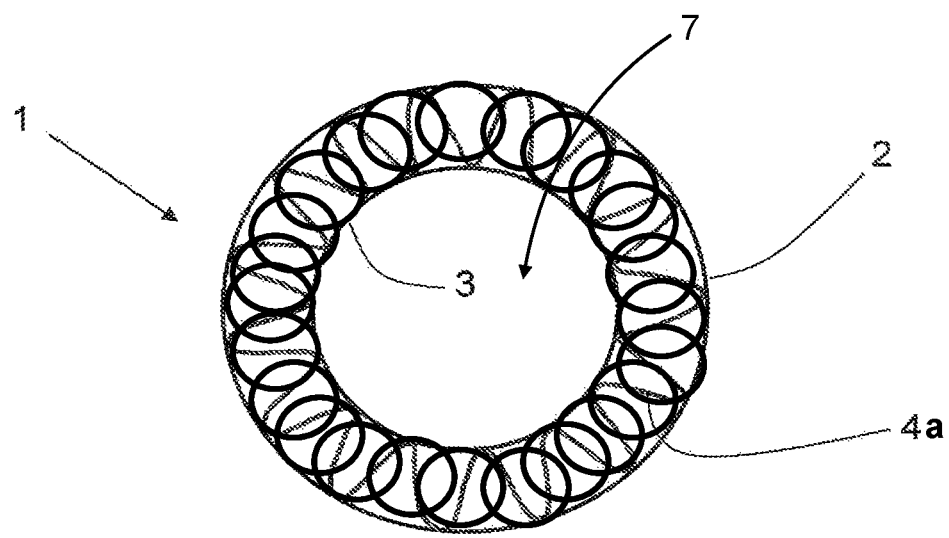
FIG. 2A shows an end view of the plug of FIG. 2 having a honeycomb mesh reinforcement.

It is envisaged that alternative forms of reinforcement means could be adopted between the inner and outer tubes to provide the same benefits as the corrugated metal. Another possible example is considered to be a metal honeycomb mesh 4a of FIG. 2A.

Figure 3:
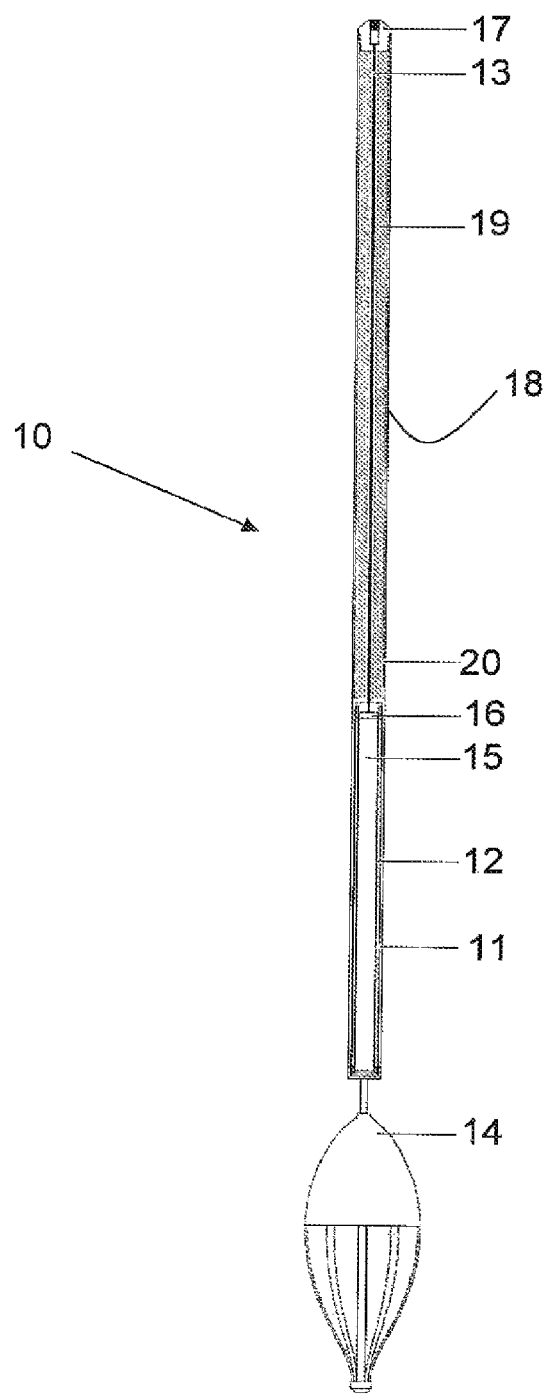
FIG. 3 shows an exposed view of the plug assembly of the second aspect of the present invention.
Figure 4:
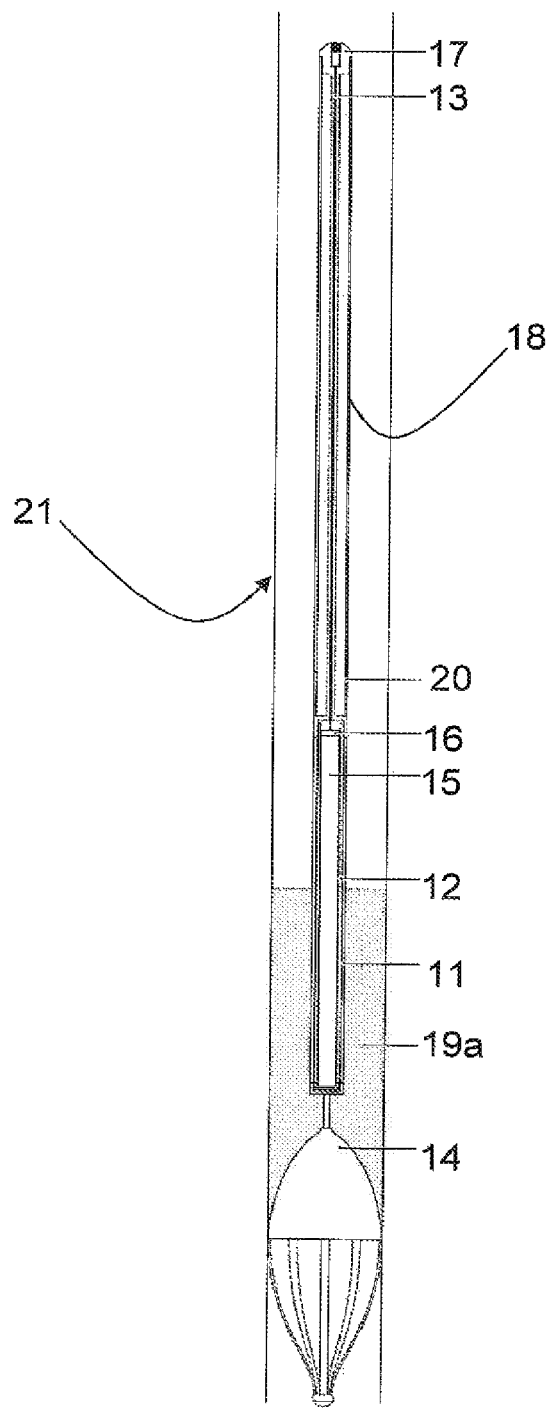
FIG. 4 shows the plug assembly of FIG. 3 in situ within a well casing.

FIGS. 3 and 4 relate to the plug deployment assembly 10 of the second aspect of the present invention. The assembly 10 shown in the figures comprises a plug body 11 (such as, but not necessarily, the one described above), a heater 12 and an igniter wire 13.

The plug body 11 is provided with an umbrella spring arrangement 14 which is mounted to the leading end of the plug 11 so that, when the assembly 10 is delivered down an underground conduit (such as a well casing) it is the umbrella spring arrangement 14 that leads the way.

The umbrella spring arrangement 14 is resiliency biased to an expanded state, as shown in the figures, in its expanded state the umbrella spring arrangement 14 serves to increase the effective width of the plug 11 and the assembly 10.

However when the umbrella spring arrangement 14 meets with obstructions as it is delivered down a well it has the capability to compress, thereby enabling the effective width of the assembly to be minimized to the size of the plug body. Once past the obstruction the umbrella spring arrangement springs back to its expanded state.

This arrangement enables the assembly 10 the present invention to be navigated down wells and other underground conduits that may be suffering from issues such as collapsed casing or may have other forms of obstacle (i.e. abandoned equipment) in them. It is also common practice to have to set plugs through production tubing to enable to get to the desired location; this also involves using a plug that can expand once it is through the tubing. This enables plugs to be deployed into wells in situations that previously might have been impossible, or at best a costly exercise.

The heater 12 is releasably engaged within the plug body 11 so that the heater can be retrieved from the plug body once it has been fixed into a well and the eutectic alloy plug has formed.

The heater 12, which is preferably a thermite based chemical reaction source heater, is provided with a heater core 15 and an igniter/initiator 18. The heater 12 is attached to the igniter wire 13 so that the assembly can be delivered down a well and then the heater can be subsequently retrieved. The igniter wire 13 is connected to a standard wireline connector 17 to facilitate the delivery of the assembly down a well.

The igniter wire 13 is connected to the igniter/initiator 16 through the wireline connector 17 to enable the remote operation of the initiator 16 from ground level. Preferably, and as mentioned above, a twin stage activation of both the igniter and the dump bailer may be achieved by a single signal.

It is envisaged that the igniter/initiator 16 might be alternatively initiated by a pressure pulse, radio wave, fiber optic cable, timers or other remote means.

This enables the heater to be deployed using coiled tubing or even slick line, which are non-electrically conductive delivery mechanisms). This is particularly useful when using heaters with chemical source heaters rather than electrical heat sources, which require a constant supply of electrical current to power them.

The assembly 10 is further provided with a dump bailer 18, within which the eutectic alloy (e.g. bismuth alloy) is transported down the well to the site where the plug is to be formed.

In order to minimize the effective width of the assembly, and aid its delivery down a well, the dump bailer is located above but in-line with the heater/plug in the region adjacent to the wireline 13.

The alloy is preferably provided in the form of shot or small beads 19 so that it can freely escape the dump bailer 18 via the release means 20. As with the initiator 16, the release means 20 can be operated remotely via the wireline connector 17 or other means (see above).

Once the release means 20 are actuated gravity ensures that the alloy shot is ejected from the dump bailer into the region adjacent to the plug 11 and the heater 12. However it is envisaged that alternative means for ejecting the alloy from the dump bailed might be adopted without departing from the general concept of the invention.

As will be appreciated from FIG. 4, the expanded umbrella spring arrangement 14 makes contact with the side walls of the underground conduit 21 so that the alloy shot 19 does not simply fail past the plug 11. Once collected adjacent the plug/heater the heater can be actuated to melt the alloy and form a molten alloy. The umbrella spring arrangement 14 is preferably made from, or coated in, a heat resistant material to ensure that the molten alloy does not melt through it.

The molten alloy is then allowed to cool where upon it expands to secure the plug body 11 relative to the underground conduit 21. Once the alloy 19a has cooled (and the plug is secure) the heater 12 can be extracted using the wireline 13.

Although not essential, if is envisaged that the alloy delivered by the assembly 10 might be a Germanium/Bismuth alloy, which has a higher melting temperature than other Bismuth based alloys. The higher melting temperatures of such alloys make them particularly suitable for plugging deeper underground where the subterranean environment is hotter.

In such applications it is appreciated that a chemical heater is required due to the increased level of heat required to melt the alloy (e.g. 550.degree. C). In particular it is appreciated that a chemical reaction heat source with a fuel composition comprising a mix of thermite and a damping agent would be particularly preferable, with solid mixes of these fuel compositions being especially desirable.

What is claimed is:

1. A plug for use in a well, for plugging the well, and in particular oil and gas wells, the plug comprising:

a plug body formed from an outer metal tube of a reduced thickness, wherein the outer metal tube defines an opening at a top and a bottom of the tube;

reinforcement means, attached to an inner surface of the outer tube to give the plug a cross-sectional structural strength that is at least equivalent to that of a thicker metal tube;

an inner metal tube having a top and a bottom and connected co-axially with the outer metal tube by way of the reinforcement means, which attached to the inner surface of the outer tube and an outer surface of the inner tube at discrete points;

a base connected to a bottom of the outer and inner tube, whereby the base seals the bottom of the outer and inner metal tube and thereby seals the bottom opening of the plug;

wherein said plug has a central void defined by an inner surface of the inner tube of the plug body and configured to receive a heater located along the axis of the plug; and wherein the outer tube, the inner surface and the base are configured to plug the well when deployed and thereby preventing materials from escaping the well.

2. The plug of claim 1, wherein the reinforcement means attached to the outer tube comprises corrugated metal.

3. The plug of claim 1, wherein the reinforcement means attached to the outer tube comprises a honeycomb metal mesh.

* * * * *